(12) United States Patent
Akerib

(10) Patent No.: US 11,941,407 B2
(45) Date of Patent: Mar. 26, 2024

(54) PIPELINE ARCHITECTURE FOR BITWISE MULTIPLIER-ACCUMULATOR (MAC)

(71) Applicant: GSI Technology Inc., Sunnyvale, CA (US)

(72) Inventor: Avidan Akerib, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 790 days.

(21) Appl. No.: 16/840,393

(22) Filed: Apr. 5, 2020

(65) Prior Publication Data

US 2020/0371813 A1 Nov. 26, 2020

Related U.S. Application Data

(60) Provisional application No. 62/850,033, filed on May 20, 2019.

(51) Int. Cl.
*G06F 9/38* (2018.01)
*G06F 7/544* (2006.01)
*G06F 9/30* (2018.01)

(52) U.S. Cl.
CPC .......... *G06F 9/3893* (2013.01); *G06F 7/5443* (2013.01); *G06F 9/30014* (2013.01); *G06F 9/30079* (2013.01)

(58) Field of Classification Search
CPC .............. G06F 7/5443; G06F 9/30079; G06F 9/30014; G06F 9/3893
See application file for complete search history.

(56) References Cited

U.S. PATENT DOCUMENTS

| | | | | |
|---|---|---|---|---|
| 5,583,804 A | * | 12/1996 | Seal | G06F 7/5443 708/523 |
| 7,565,390 B1 | * | 7/2009 | Lui | H03K 19/17704 708/606 |
| 8,238,173 B2 | | 8/2012 | Akerib | |
| 8,463,836 B1 | * | 6/2013 | Pugh | G06F 7/57 708/235 |
| 9,418,719 B2 | | 8/2016 | Akerib | |
| 9,558,812 B2 | | 1/2017 | Akerib | |
| 10,534,836 B2 | | 1/2020 | Akerib | |
| 2012/0233234 A1 | * | 9/2012 | Brooks | G06F 7/5338 708/521 |
| 2018/0157621 A1 | | 6/2018 | Akerib | |

* cited by examiner

*Primary Examiner* — Michael D. Yaary
(74) *Attorney, Agent, or Firm* — HEIDI BRUN ASSOCIATES LTD.

(57) ABSTRACT

A unit for accumulating a plurality N of multiplied M bit values includes a receiving unit, a bit-wise multiplier and a bit-wise accumulator. The receiving unit receives a pipeline of multiplicands A and B such that, at each cycle, a new set of multiplicands is received. The bit-wise multiplier bit-wise multiplies bits of a current multiplicand A with bits of a current multiplicand B and to sum and carry between bit-wise multipliers. The bit-wise accumulator accumulates output of the bit-wise multiplier thereby to accumulate the multiplicands during the pipelining process.

21 Claims, 12 Drawing Sheets

PIPELINE ARCHITECTURE FOR BITWISE MULTIPLIER-ACCUMULATOR (MAC)

CROSS REFERENCE TO RELATED APPLICATIONS

This application claims priority from U.S. provisional patent application 62/850,033, filed May 20, 2019, which is incorporated herein by reference.

FIELD OF THE INVENTION

The present invention relates to multiply-accumulators generally.

BACKGROUND OF THE INVENTION

Multiplier-accumulators (MACs) are known in the art and are used to handle the common operation of summing a large number of multiplications. Such an operation is common in dot product and matrix multiplications, which are common in image processing, and in convolutions that are used in neural networks.

Mathematically, the multiply-accumulate operation is:

$$\Sigma_i A_i k_i \qquad \text{Equation 1}$$

where the $A_i$ and the $k_i$ are 8, 16 or 32 bit words.

In code, the MAC operation is:

$$q_i = q_i + (A_i * k_i) \qquad \text{Equation 2}$$

where the $q_i$ variable accumulates the values $A_i k_i$.

Because the MAC operation is so common, MACs are typically implemented in hardware as separate units, either in a central processing unit (CPU) or in a digital signal processor (DSP). The MAC typically has a multiplier, implemented with combinational logic, an adder and an accumulator register. The output of the multiplier feeds into the adder and the output of the adder feeds into the accumulator register. The output of the accumulator register is fed back to one input of the adder, thereby to produce the accumulation operation between the previous result and the new multiplication result. On each clock cycle, the output of the multiplier is added to the register.

The multiplier portion of the MAC is typically implemented with combinational logic while the adder portion is typically implemented as an accumulator register that stores the result.

SUMMARY OF THE PRESENT INVENTION

There is therefore provided, in accordance with a preferred embodiment of the present invention, a method for accumulating a plurality N of multiplied M bit values. The method includes pipelining multiplicands A and B to a multiply-accumulator such that, at each cycle, a new set of multiplicands is received; at each cycle, bit-wise multiplying bits of a current multiplicand A with bits of a current multiplicand B and summing and carrying between bit multipliers; and at each cycle, bit-wise accumulating of output of the bit-wise multiplying thereby to accumulate the multiplicands during the pipelining process.

There is also provided, in accordance with a preferred embodiment of the present invention, a method for accumulating a plurality N of multiplied M bit values. The method includes performing the following for each pair of multiplicands A and B, each of M bits. In M rows, each of M multiplication units, separately multiplying each bit of the multiplicand A with each bit of the multiplicand B and separately summing results from a previous row of the multiplication units. In M rows of summing units following the M rows of multiplication units, separately summing results from a previous row of the summing units or the multiplication units. The rows sum output towards an accumulator formed as a column. In accumulator units of the accumulator, separately accumulating each bit of a result from the bit output of each row and passing carry values along the bits of the result from the LSB (least significant bit) to the MSB (most significant bit) of the result.

Moreover, in accordance with a preferred embodiment of the present invention, the multiplication units, the summing units and the accumulator units are bit-line processors.

Further, in accordance with a preferred embodiment of the present invention, the method also includes providing one new pair of multiplicands A and B to an upper row of the multiplication units at each operating cycle.

Still further, in accordance with a preferred embodiment of the present invention, the separately summing at least includes generating sum and carry values at least one of the multiplication and summing units and passing the carry values down a row and the sum values to the right and down a row at each cycle.

Additionally, in accordance with a preferred embodiment of the present invention, the method includes passing the bits of multiplicand A down a row at each cycle and passing the bits of multiplicand B to the right and down a row at each cycle.

Further, in accordance with a preferred embodiment of the present invention, M is a power of 2.

Still further, in accordance with a preferred embodiment of the present invention, the method includes separately storing one bit of the result per cycle after the providing ceases, the storing beginning at the LSB and moving toward the MSB.

Moreover, in accordance with a preferred embodiment of the present invention, when N is 1, the output of the accumulator is a multiplication of multiplicands A and B.

There is also provided, in accordance with a preferred embodiment of the present invention, a unit for accumulating a plurality N of multiplied M bit values. The unit includes a receiving unit, a bit-wise multiplier and a bit-wise accumulator. The receiving unit receives a pipeline of multiplicands A and B such that, at each cycle, a new set of multiplicands is received. The bit-wise multiplier bit-wise multiplies bits of a current multiplicand A with bits of a current multiplicand B and sums and carries between bit-wise multipliers. The bit-wise accumulator accumulates output of the bit-wise multiplier thereby to accumulate the multiplicands during the pipelining process.

Moreover, in accordance with a preferred embodiment of the present invention, the bit-wise multiplier includes M rows of M multiplication units each and M rows of summing units following the M rows of multiplication unit, where each row includes M summing units. Each multiplication unit separately multiplies each bit of the multiplicand A with each bit of the multiplicand B and separately sums results from a previous row of the multiplication units. Each summing unit separately sums results from a previous row of the summing units or the multiplication units, where the rows sum output towards the bit-wise accumulator.

Further, in accordance with a preferred embodiment of the present invention, the bit-wise accumulator includes accumulator units of the accumulator formed in a column. Each accumulator unit separately accumulates a bit of a result from the bit output of its associated row and to pass carry values along the bits of the result from the LSB (least significant bit) to the MSB (most significant bit) of the result.

Still further, in accordance with a preferred embodiment of the present invention, the multiplication units, the summing units and the accumulator units are bit-line processors.

Moreover, in accordance with a preferred embodiment of the present invention, an upper row of the multiplication units receives one new pair of multiplicands A and B at each operating cycle.

Further, in accordance with a preferred embodiment of the present invention, the summing units are in communication with summing units in a row therebelow to pass carry values down a row and sum values to the right and down a row at each cycle.

Still further, in accordance with a preferred embodiment of the present invention, the multiplication units are in communication with multiplication units in a row therebelow to pass bits of multiplicand A down a row at each cycle.

Moreover, in accordance with a preferred embodiment of the present invention, the unit also includes bit passing units to pass each bit of multiplicand B to its associated row of multiplication units.

Further, in accordance with a preferred embodiment of the present invention, when N is 1 and the output of the bit-wise accumulator is a multiplication of multiplicands A and B.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
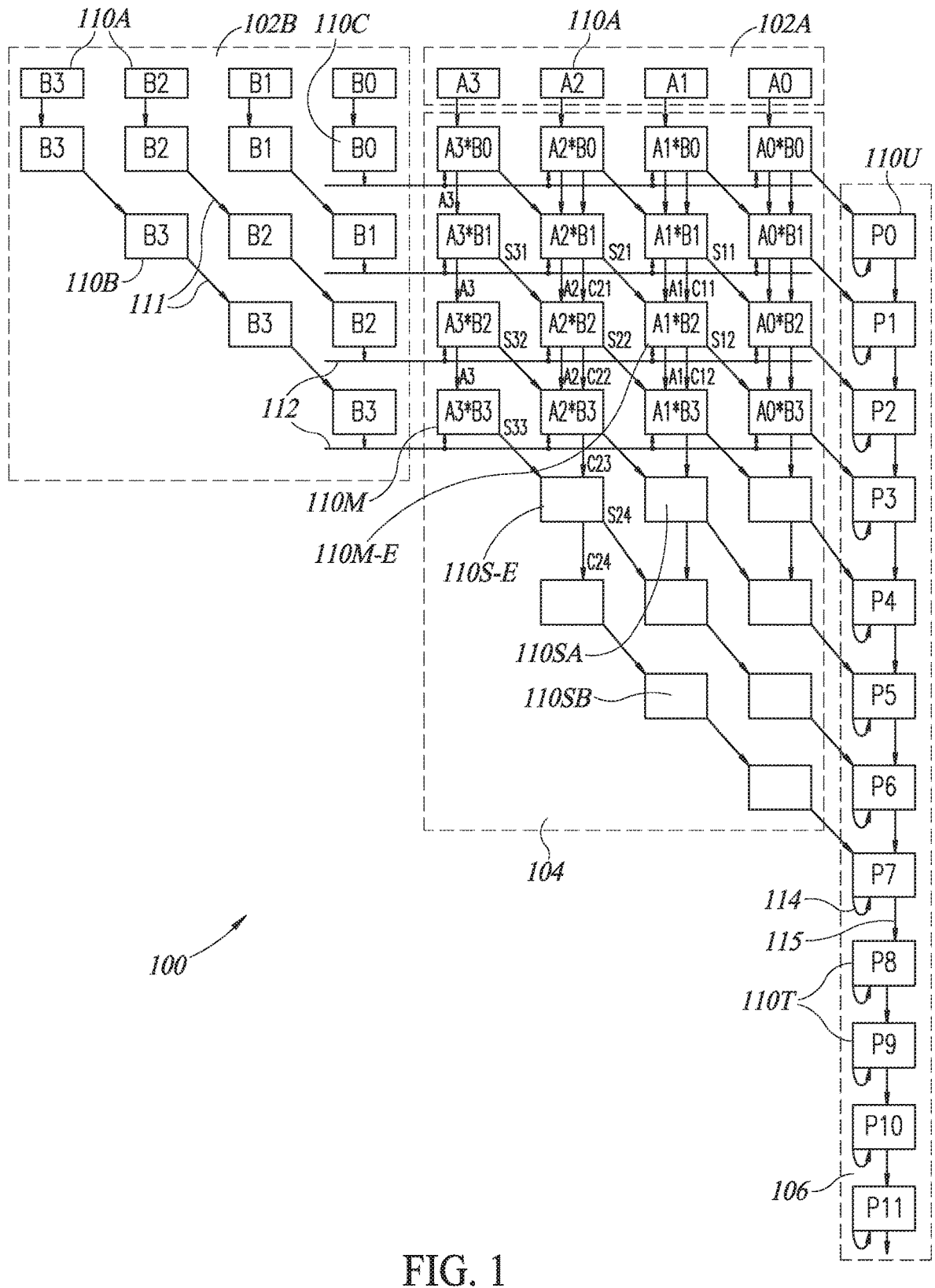
FIG. 1 is a schematic illustration of a pipelined multiplier-accumulator, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that it is possible to accumulate the result during the multiplication operation. This is significantly faster and more efficient than accumulating only once the pair of values has been multiplied. Moreover, it reduces chip real estate since the multiplier and the accumulator are part of a single unit, rather than two separate units.

Applicant has further realized that, when the multiplier and accumulator are part of a single unit, the unit should accumulate each bit separately while handling carry values. Moreover, once each bit is separately handled, the operation may be pipelined. Applicant has realized that this pipelined multiplier-accumulator unit may also perform multiplication only, when only 1 multiplication operation is provided to it. Then the accumulation is of a single result.

Reference is now made to FIG. 1, which illustrates a bit-wise multiplier-accumulator 100, constructed and operative in accordance with a preferred embodiment of the present invention. Bit-wise multiplier-accumulator 100 may be implemented in an in-memory associative processor, such as those discussed in U.S. Pat. Nos. 8,238,173, 9,418,719, and 9,558,812, currently owned by the Applicant of the present application and incorporated herein by reference. An in-memory processor processes data within a memory array, which has a multiplicity of memory cells in a matrix of rows and columns, and the columns are organized into processors. Boolean computational operations occur in the processors when multiple rows are activated together, with the results being read in column decoders of the processors.

Bit-wise multiplier-accumulator 100 comprises separate input units 102A and 102B for each multiplicand A and B, respectively, a bit-wise multiplier unit 104 and a bit-wise accumulator unit 106, where each unit 102, 104 and 106 may be comprised of multiple processors 110 which may operate on a bit or on a pair of bits, one from each of multiplicands A and B, during each operation cycle. Processors 110 may be any suitable processor and may be implemented, as described in the example herein, as bit line processors 110, described in more detail hereinbelow.

In bit-wise multiplier-accumulator 100, processors 110 may be formed into rows and columns where input unit 102A may be formed of a single row of processors 110 above multiplier 104, accumulator 106 may be located to the right of bit-wise multiplier 104 and input unit 102B may be located to the left of an upper portion of bit-wise multiplier 104.

Bit-wise multiplier-accumulator 100 may operate on multiplicands A and B, which may have 4, 8, 16, 32, 64 or more bits, as desired. In the example of FIG. 1, the bit-wise multiplier-accumulator operates on only 4-bit multiplicands A and B.

Input unit 102A may comprise a row of M receiving processors 110A, where M is the number of bits in multiplicand A and where M is 4 in FIG. 1. At each operation cycle, each processor 110A may receive one bit of the current multiplicand A, where the least significant bit A0 of multiplicand A may be located to the furthest right of the row and the most significant bit A3 may be located to the furthest left of the row. At the next operation cycle, processors 110A may pass the values stored therein from the previous cycle into a first row of processors 110M of multiplier 104 and may receive the bits from the next multiplicand A. Thus, for input unit 102A, all bits may move down (i.e. vertically) a row each cycle. As can be seen, for M cycles, the bits of multiplicand A are passed down to the next row. Thus, the first four rows of multiplier 104 in FIG. 1 show, from left to right, bits A3-A0 in them.

Input unit 102A may provide the bits of multiplicand A down a row each cycle; however, according to a preferred embodiment of the present invention, as described in more detail hereinbelow, most processors 110 in multiplier-accumulator 100 may pass their data down and to the right (towards accumulator 106) at each cycle.

Input unit 102B may comprise three types of processors 110; 1) a row of receiving processors 110A, typically aligned in the same row as the processors 110A of input unit 102A, 2) data-passing processors 110B which may pass the values stored therein from the previous cycle down and to the right at each cycle (as indicated by angled arrows 111), and 3) signaling processors 110C which may provide the values stored therein to a signaling line 112 providing input to a row of processors 110 in multiplier 104.

It will be appreciated that signaling processors 110C may provide the associated bit of multiplicand B to each of the first M rows of bit-wise multiplier 104. Moreover, data-passing processors 110B may be formed into a triangle in order to provide a different bit value to each of the first M rows of multiplier 104. Thus, input unit 102B may provide the least significant bit B0 of multiplicand B to the first row of multiplier 104, the next significant bit of multiplicand B to the second row of multiplier 104, etc. FIG. 1 shows four rows, each one receiving a different bit of multiplicand B along its signaling line 112. FIG. 1 also shows four columns, each receiving a different bit of multiplicand A, with the least significant bit to the right, the next significant bit to its left, etc.

Bit-wise multiplier unit 104 may comprise an M×M matrix of multiplying processors 110M and M rows of summing processors 110S. Each multiplying processor 110M in the first row of multiplier 104 may receive a bit of multiplicand A and a bit of multiplicand B as input, may multiply them together and may generate their two-bit result (recall that 1+1=10 in binary). The two bits are called a "sum" bit and a "carry" bit, where the sum is the rightmost bit of the result and the carry is the leftmost bit of the result (e.g. for 1+1=10, the sum bit is 0 and the carry bit is 1).

The remaining multiplying processors 110M may receive a sum bit (from the processor above it and to its left), a carry bit and a bit from multiplicand A (from the processor above it), and a bit from multiplicand B from its signaling line 112. These processors 110M may perform the multiplication operation between its multiplicand bits to which they may add the sum and carry values, generating a new sum and carry bit as output. In FIG. 1, multiplying processors 110M are labeled by the multiplicand bits which they are multiplying.

For example, the multiplying processor 110M-E may receive the value of bit A1 from the multiplying processor performing the multiplication of A1*B1 directly above it and may receive the value of bit B2 from its associated signaling line 112. Multiplying processor 110M-E may perform the multiplication of A1*B2 and may add to it the sum S21 from the multiplication of A2*B1 in the row above and to the left and the carry C11 from the multiplication of A1*B1 directly above it. Multiplying processor 110M-E may provide its sum result S12 to the multiplying processor to perform the operation A0*B3 (e.g. the sum bit S12 moved down and to the right) and its carry result C12 and the value of A1 to the multiplying processor to perform the operation A1*B3 (e.g. the carry bit C12 and the A bit moved down).

As can be seen in FIG. 1, multiplying processors 110M may provide their carry bits Cij (where i is the index of their A bit and j is the index of their B bit) and their multiplicand bits Ai vertically down to the multiplying processors 110M of the next row and may provide their sum bits Sij down and to the right (i.e. to the multiplying processors 110M of one column to the right in the next row). Note that, in the present application, the i index refers to the columns while the j index refers to the rows (each Ai bit remains the same within a column while each Bj bit remains the same within a row).

It will be appreciated that the multiplying processors 110M operating on the MSB (most significant bit) bits (A3 in the example of FIG. 1) receive only the multiplicands (A3 and Bj in the example of FIG. 1) and, as a result, generate only sum bits. The rest of units 110M may receive both a sum and a carry bit. It will further be appreciated that the multiplying processors 110M operating on the LSB (least significant bit) bits (A0 in the example of FIG. 1) may pass their sum bits to bit-wise accumulator unit 106.

Each summing processor 110S in the second portion of multiplier 104 may either be adding processors 110SA, which only perform an addition operation on their input or data-passing processors 110SB which may pass the carry values stored therein from the previous cycle down and to the right at each cycle. No type of summing processor 110S receives any multiplicand bits as input.

Each summing processor 110SA may add together a sum bit (from the processor above it and to its left) and a carry bit (from the processor above it) and may provide the sum bit of the result to the processor below it and to its right and the carry bit to the processor below it. Because there are no new input multiplicands, there are fewer summing processor 110S per row. FIG. 1 shows 3 in the first two rows, 2 in the third row and one in the fourth and final row. Similar arrangements may be made for multiplicands with more bits.

For example, the summing processor 110S-E may receive the sum bit S33 from the multiplying processor performing the multiplication of A3*B3 in the row above and to the left and may receive the carry bit C23 from the multiplying processor performing the multiplication of A2*B3 directly above it. Summing processor 110S-E may add the sum bit S33 and the carry bit C23 and may provide its sum result S24 to the summing processor down and to its right and its carry bit C24 to the summing processor directly below it.

It will be appreciated that each multiplying processor 110M performs a bit-wise multiplication. Rather than multiplying the two multi-bit input numbers A and B together and then adding them together, each multiplying processor 110M not only multiplies its associated multiplicand bits together but also adds to its result the sum and carry information received from neighboring multiplying processors. It then provides its sum and carry information to its neighboring multiplying processors. Multiplier 104 is thus a "bit-wise" multiplier.

It will further be appreciated that each row of multiplier 104 may sum the output of the row towards bit-wise accumulator 106.

Bit-wise accumulator unit 106 may comprise a line of accumulating processors 110U and tail end processors 110T, generating their respective result bit Pk. Applicant has realized that each bit of an accumulated result is accumulated from the LSB to the MSB and that the LSB is always the accumulated value of the LSB bit multiplications. Thus, the LSB sum bit may be provided from the multiplying processor 110M multiplying A0*B0 to the first accumulating processor 110U in bit-wise accumulator unit 106. Note that the first accumulating processor 110U begins in the second row of processors 110.

Moreover, Applicant has realized that, due to the summing and carrying operations performed within bit-wise multiplier 104, each accumulating processor 110U may receive the sum bit from its neighboring multiplying processor 110M or summing processor 110S, to be added to its previously accumulated values.

Accordingly, each processor 110U and 110T of accumulator unit 106 may generate a sum and a carry bit, may return its sum bit back to itself (as indicated by the return arrows 114 and as input for the next cycle) and may provide its carry bit to the next processor in the line (as indicated by arrows 115). As mentioned hereinabove, accumulating processors 110U may also receive sum bits from neighboring multiplying processors 110M and summing processors 110S. However, tail end processors 110T may only operate on their fed back sum bits and on carry bits from their predecessor processor, 110S or 110T, in the line.

Note that there may be M rows of both multiplying processors 110M and summing processors 110S such that there may be 2M accumulating processors 110U. There may be Q tail end processors 110T, where Q is at least log 2(N) and N is the number of values to be multiplied and accumulated.

It will be appreciated that operations in multiplier-accumulator 100 may happen in parallel, where each column may operate at the same time as the other columns. Thus, increasing the precision from 4 bits to 8 bits does not significantly affect the timing of multiplier-accumulator 100, though it does increase its size.

Moreover, it will be appreciated that multiplier-accumulator 100 may operate for integer operations only as it does not handle exponents.

Figure 2A:
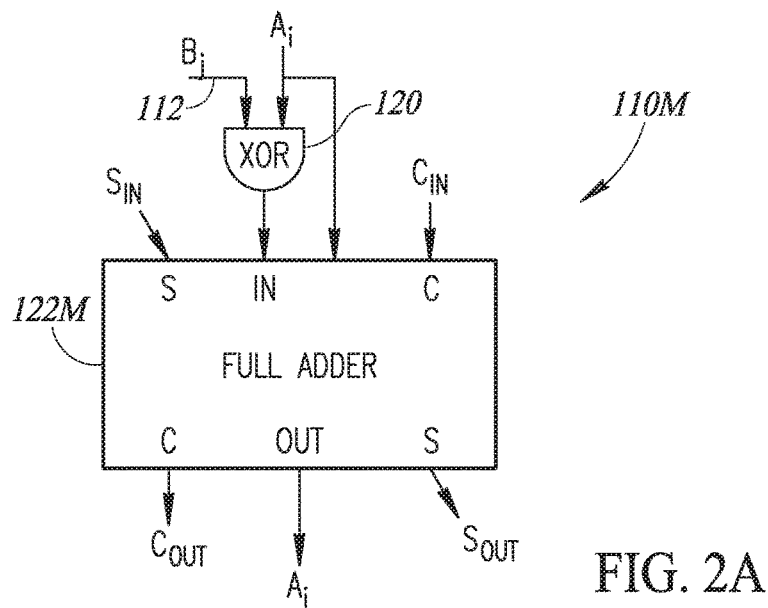
FIGS. 2A, 2B and 2C are schematic illustrations of a multiplying processor, a summing processor and an accumulating processor, respectively, useful in the multiplier-accumulator of FIG. 1.
Figure 2B:
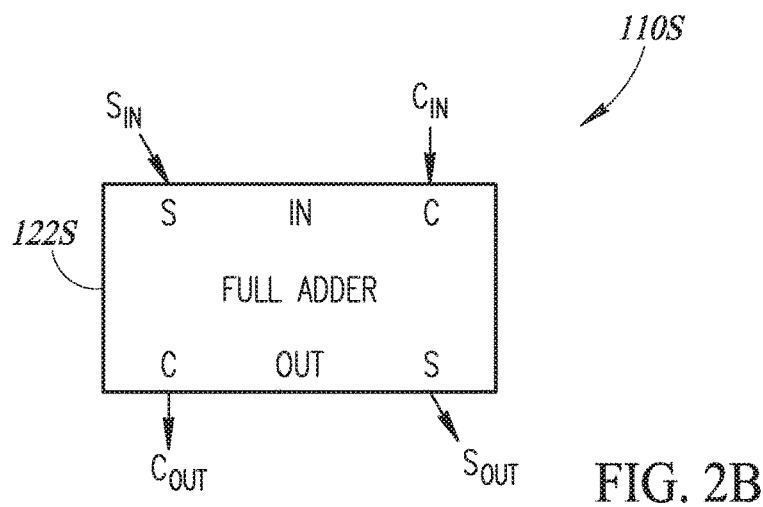
Figure 2C:
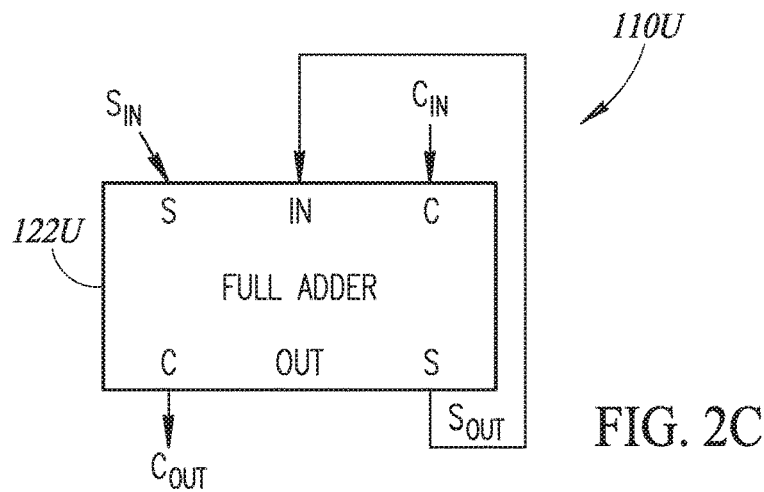

Reference is now briefly made to FIGS. 2A, 2B and 2C, which illustrate processors 110M, 110S and 110U, respectively. Multiplying processor 110M comprises a XOR operator 120 and a full adder 122M.

XOR operator 120 may receive the multiplicand bits Ai and Bj and may produce their multiplication Ai*Bj. XOR operator 120 may be any suitable XOR operator. For example, it may be implemented on a bit-line and may provide its output to one of the inputs, labeled In, of full adder 122.

Full adder 122M may add an input sum bit $S_{in}$ and an input carry bit $C_{in}$, received from previous calculations, to a current input value (i.e. the XOR output). Full adder 122M may produce new sum and carry bits $S_{out}$ and $C_{out}$, respectively, and may pass the received value of Ai.

Full adder 122M may be any suitable full adder. For example, it might be similar to that described in U.S. patent application Ser. No. 15/708,181, published as US 2018/0157621, now issued as U.S. Pat. No. 10,534,836, assigned to the present applicant of the present application and incorporated herein by reference. U.S. Pat. No. 10,534,836 discusses how to implement multiple, parallel full adders 122 within the memory array such that all addition operations occur in parallel. The addition of XOR 120 adds a minimal amount of operation and can also be performed in parallel. Thus, each row of bit-line processors 110 may operate in parallel with each other, multiplying Ai by Bj and then adding the result to the sum and carry bits provided to them.

As shown in FIG. 2B, summing processor 110S may be similar to multiplying bit-line processor 110M but without XOR operator 120. Instead, it comprises only full adder 122S and may add an input sum bit S. and an input carry bit $C_{in}$, received from previous calculations. Full adder 122S may produce new sum and carry bits $S_{out}$ and $C_{out}$, respectively.

As shown in FIG. 2C, accumulating processor 110U may be similar to summing bit-line processor 110S but with a feedback loop of $S_{out}$. Full adder 122U may add an input sum bit $S_{in}$ and an input carry bit $C_{in}$, received from previous calculations, to the output sum bit $S_{out}$ from the previous calculation. Full adder 122U may produce new sum and carry bits $S_{out}$ and $C_{out}$, respectively.

The remaining discussion will present an exemplary implementation with processors 110 as bit-line processors; however, it will be appreciated that the present invention may be implemented with non-bit-line processors as well.

Applicant has realized that the structure of bit-wise multiplier-accumulator 100 may enable a pipelining operation, which is a very efficient operation. Once the first row of operations finishes (i.e. multiplying the Ai's by B0 in the first cycle), the Ai's move down a row and the Bj's move down and to the right, which brings B1-B3 to the second row.

A new set of Ai's and Bj's are brought in at the next cycle and provided to the first row and thus, the second row may operate on the data from the first cycle while the first row may operate on data from the second cycle. At each cycle, the old data moves down a row and new data moves into the now vacated, previous row.

In the second cycle, the LSB bit is provided to the first accumulating bit-line processor 110U to begin accumulating result bit P0. As mentioned hereinabove, each accumulating bit-line processor 110U may output its carry bit but its sum is returned to it to add to the values produced in the next cycle. This is the accumulation operation—sum in place and carry to the next more significant bit.

Reference is now made to FIGS. 3A-3I, which illustrates how the data moves through bit-wise multiplier-accumulator 100 over 9 cycles, for a simple addition of 3 multiplications, where each multiplicand is of 4 bits. Since there are multiple versions of all of the values, FIGS. 3A-3F label each value according to the cycle it belongs to. Thus, A01 is from the first cycle and A02 is from the second cycle, etc.

Figure 3A:
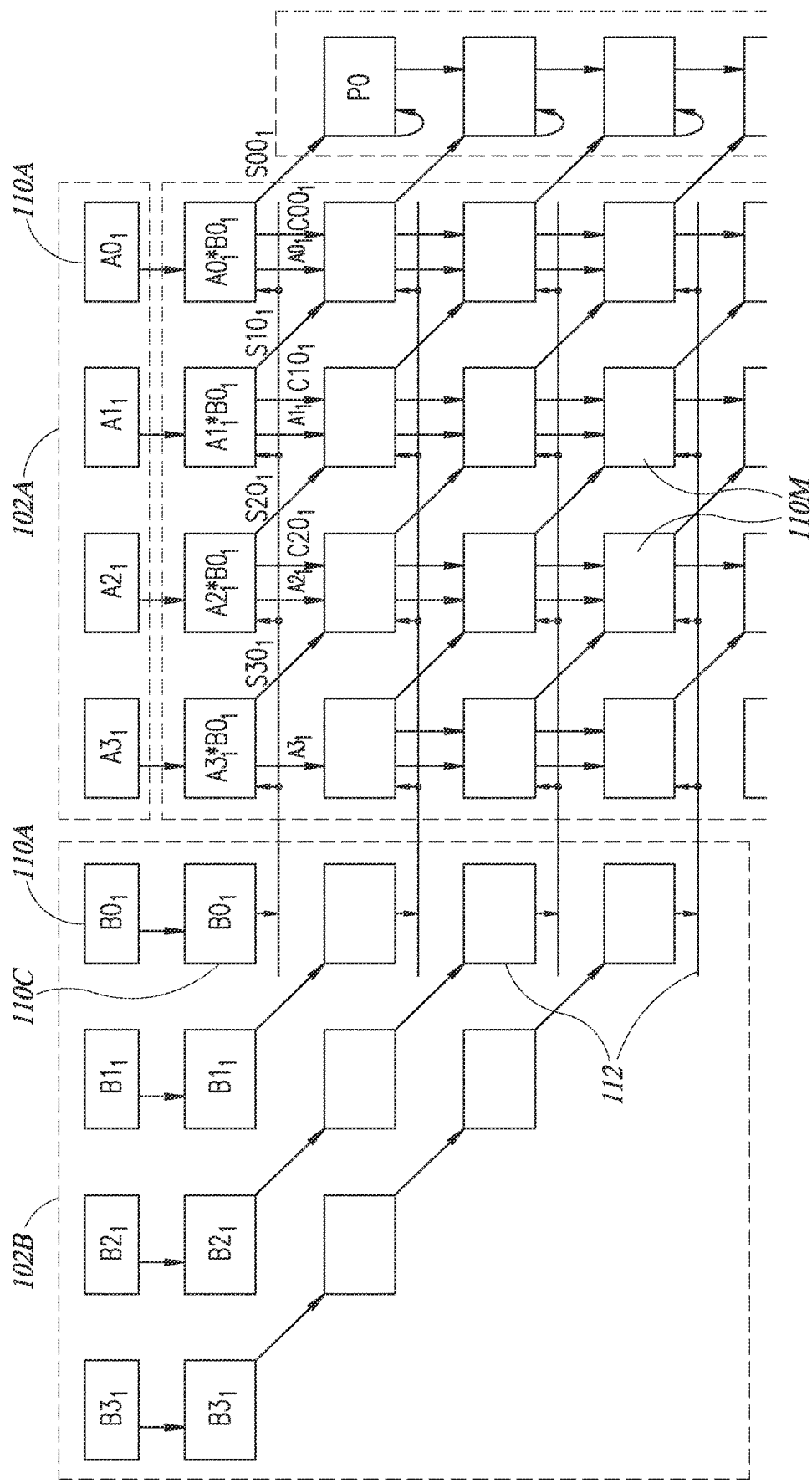
FIGS. 3A, 3B, 3C, 3D, 3E, 3F, 3G, 3H and 3I are schematic illustrations showing how the data moves through bit-wise multiplier-accumulator 100 over 9 cycles, useful in understanding the pipelined multiplier-accumulator of FIG. 1.

In a preparatory cycle, shown in FIG. 3A, a first set of multiplicand bits $Ai_1$ and $Bi_1$ are received into receiving bit line processors 110A of input units 102A and 102B, respectively. In the first cycle after the preparatory cycle, $B0_1$ may be passed to its signaling bit-line processor 110C which, in turn, may provide the value of $B0_1$ to its signaling line 112, to be available for the first row of multiplying bit-line processors 110M.

The first row of multiplying bit-line processors 110M may multiply their $Ai_1$ with $B0_1$ (e.g. $Ai_1*B0_1$) and may pass their carry bits (labeled Ci0) and their Ai down to the next row and their sum bits (labeled Si0) down and to the right in the next row. It will be appreciated that only the sum $S00_1$, from the rightmost multiplying bit-line processor 110M, may pass to its associated accumulating bit-line processor 110U, here labeled P0, to start the calculation for P0 in the next cycle.

Figure 3B:
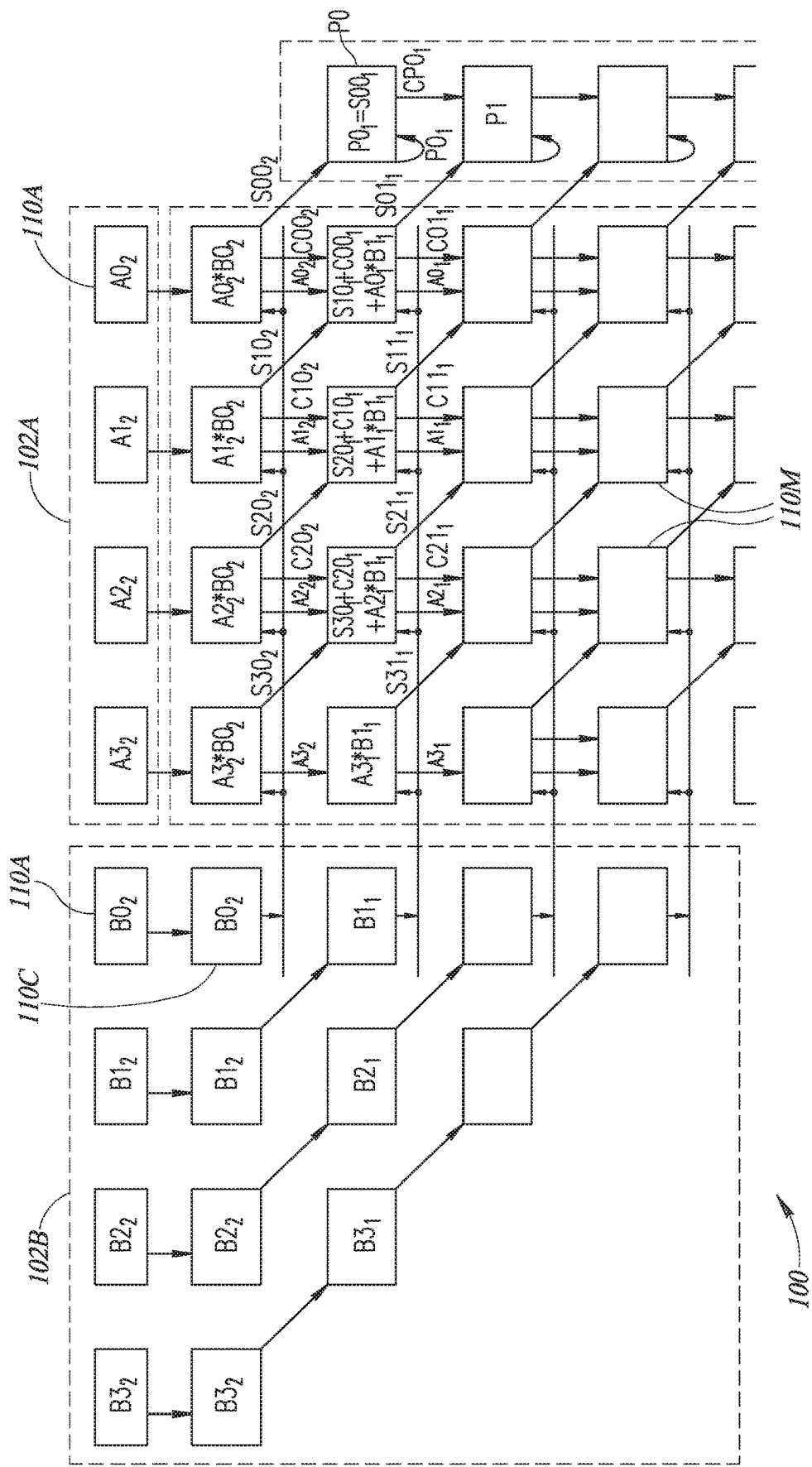

In the second cycle, shown in FIG. 3B, $B0_1$ may be received in the signaling bit-line processor 110C of the second row which, in turn, may provide its value to the signaling line 112 of the second row. At the same time, a second set of multiplicands $Ai_2$ and $Bj_2$, which were received into receiving bit line processors 110A of input units 102A and 102B, respectively, may be passed to the first row of bit-line processors of multiplier-accumulator 100. Thus, $B0_2$ may be passed to its signaling bit-line processor 110C to provide its value of $B0_2$ to the first row of multiplying bit-line processors 110M. Thus, the first row of multiplying bit-line processors 110M may multiply the $Ai_2$ with $B0_2$ while the second row of multiplying bit-line processors 110M may multiply the $Ai_1$ with $B0_1$ ($Ai_1*B1_1$) and may add the results to the sums and carries passed to them from the row above. For example, $A1_1*B1_1$ may be added to $S20_1$ and $C10_1$ to produce $S11_1$ and $C11_1$. At the end of the second cycle, the sums, carries and values of Ai from both rows of multiplying bit-line processors 110M may be passed down one row, as discussed hereinabove.

In the second cycle, the accumulation begins with accumulating bit-line processor P0 taking on the value passed to it from cycle 1 (i.e. $P0_1=S00_1$). Accumulating bit-line processor P0 may feedback the value of $P0_1$ to itself and may pass its carry output $CP0_1$ to the next accumulating bit-line processor 110U, here labeled P1, which may calculate P1. In addition, at the end of the cycle, the rightmost multiplying bit-line processors 110M of the first and second rows may pass sum bits $S00_2$ and $S01_1$ to accumulating bit-line processors P0 and P1, respectively.

Figure 3C:
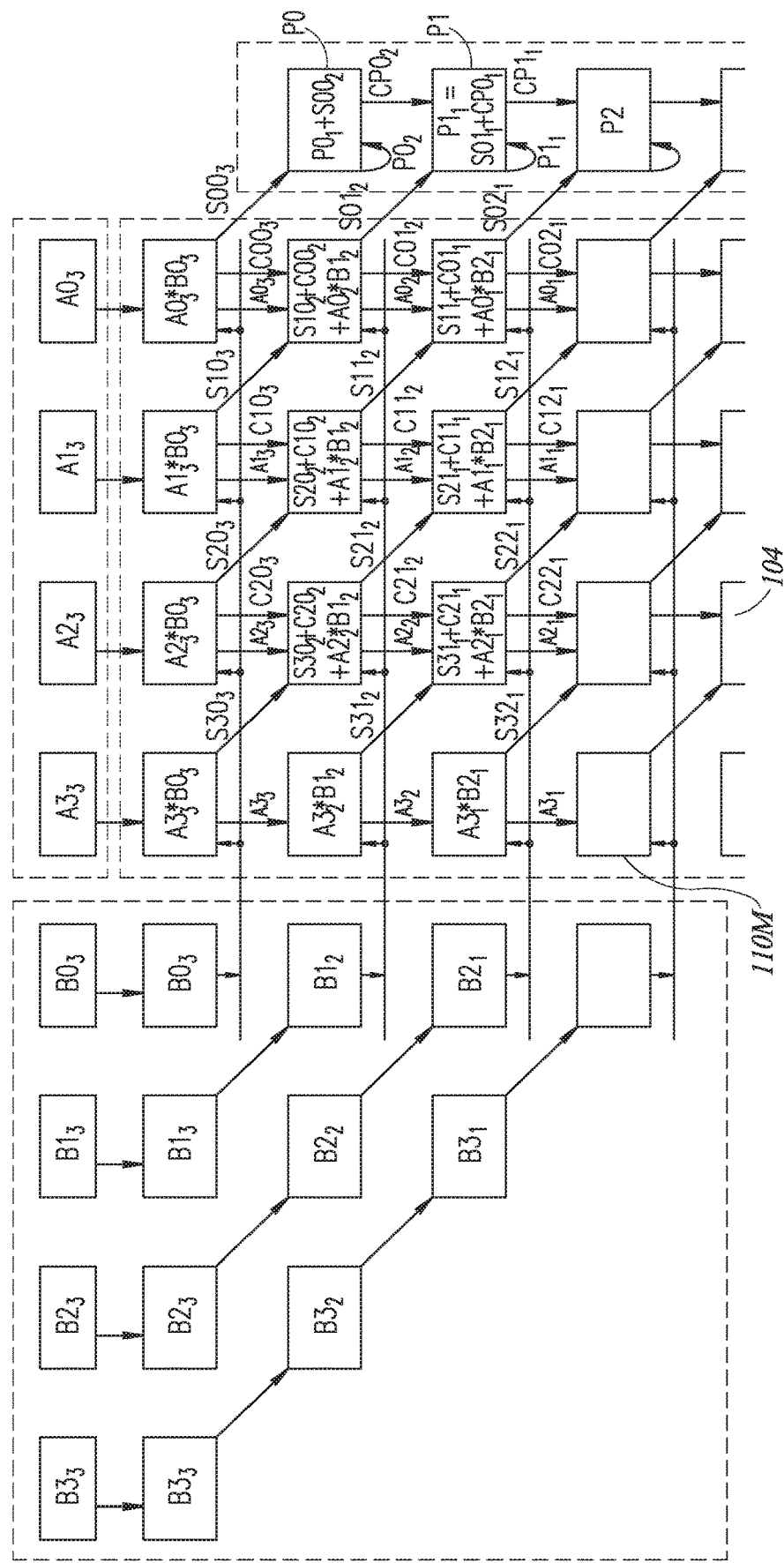

FIG. 3C shows the operations in the third cycle. The multiplication operations are very similar to those of the second cycle. In this cycle, the third row of bit-wise multiplier 104 may operate on data from the first cycle, the second row may operate on data from the second cycle and the first row may operate on data from the third cycle.

In this cycle, accumulating bit-line processor P0 adds the value of $S00_2$ passed to it from the second cycle to the previous value $P0_1$ to produce accumulation bit $P0_2$. Accumulating bit-line processor P0 may feedback the value of $P0_2$ and may pass its carry bit $CP0_2$ to accumulating bit-line processor P1. At the same time, accumulating bit-line processor P1 may add the sum bit $S01_1$ passed to it from the rightmost multiplying bit-line processor 110M of the second row, handling data of the first cycle, to the carry bit $CP0_1$ received from accumulating bit-line processor P0 in the previous cycle.

It will be appreciated that each accumulating bit-line processor, such as P0 and P1, first receives data from cycle 1, then from cycle 2, etc. Thus, in cycle 3, P1, in the third row, handles cycle 1 data while P0, in the second row, accumulates cycle 2 data on top of the cycle 1 data it received in the previous cycle.

Figure 3D:
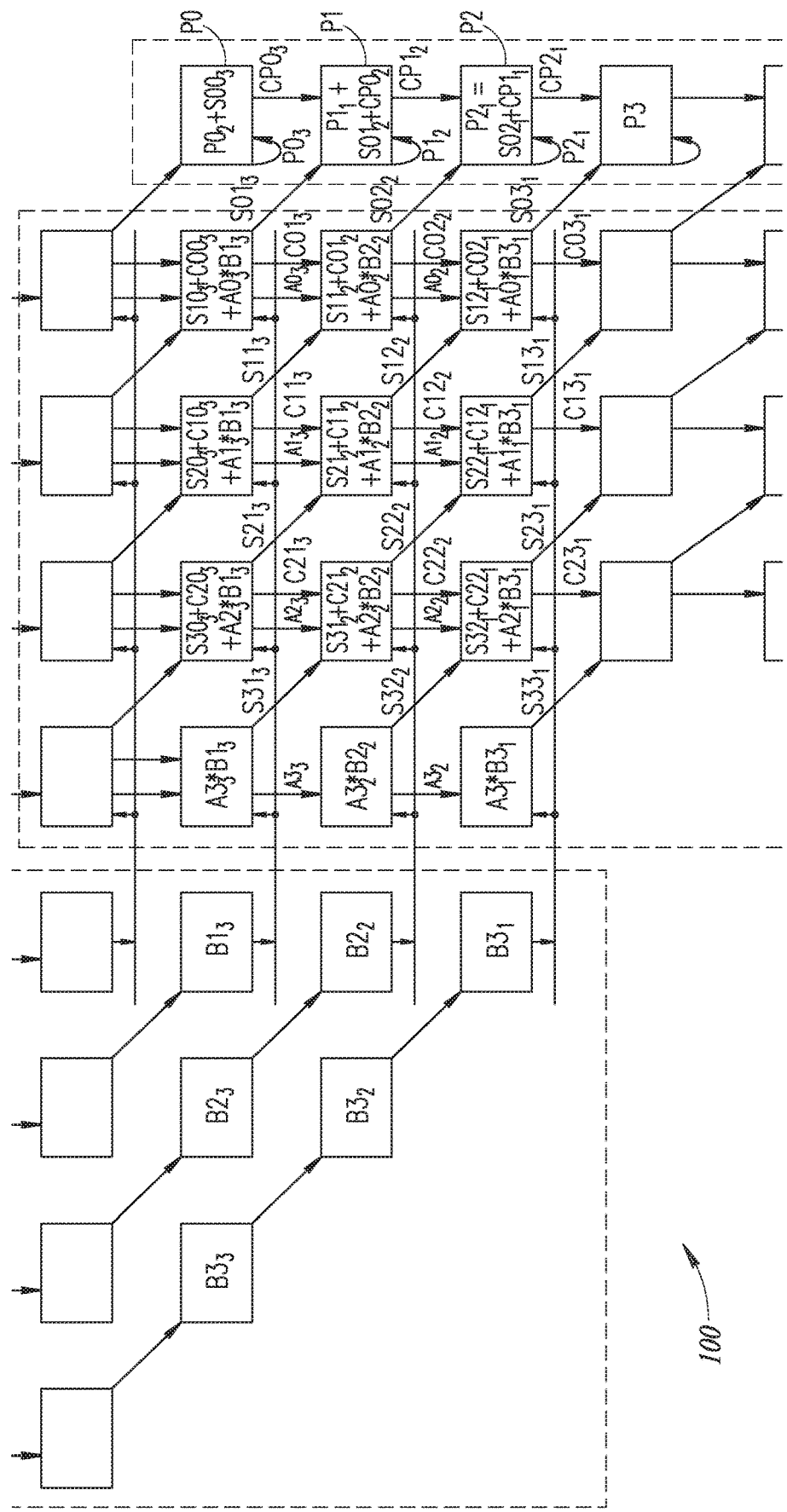

FIG. 3D shows the fourth cycle. Since this example shows an accumulation of only three multiplications, in this fourth cycle, there are no more inputs. Typically, bit-wise multiply-accumulator 100 may accumulate thousands of values but at some point, the accumulation finishes.

In FIG. 3D, accumulating bit-line processor P0 accumulates the LSB data of the third cycle and is done. The value stored therein is the LSB (i.e. P03) of the three multiplied values and thus, accumulating bit-line processor P0 may move the value stored therein to an external register (not shown).

Although not shown in FIGS. 3A-31 for ease of understanding, bit-wise multiply-accumulator 100 may start on a next MAC operation in the next cycle and may bring a new set of multiplicands A and B to be operated on by the now empty first row of multiplying bit-line processors 110M.

Accumulating bit-line processors P1 and P2 may operate as discussed hereinabove, adding received LSB sum bits with the values previously stored therein, where accumulating bit-line processor P1 may operate on data (sum from rightmost multiplying bit-line processor and carry from accumulating bit-line processor P0) from cycle 2 and accumulating bit-line processor P2 may operate on data from cycle 1.

Figure 3E:
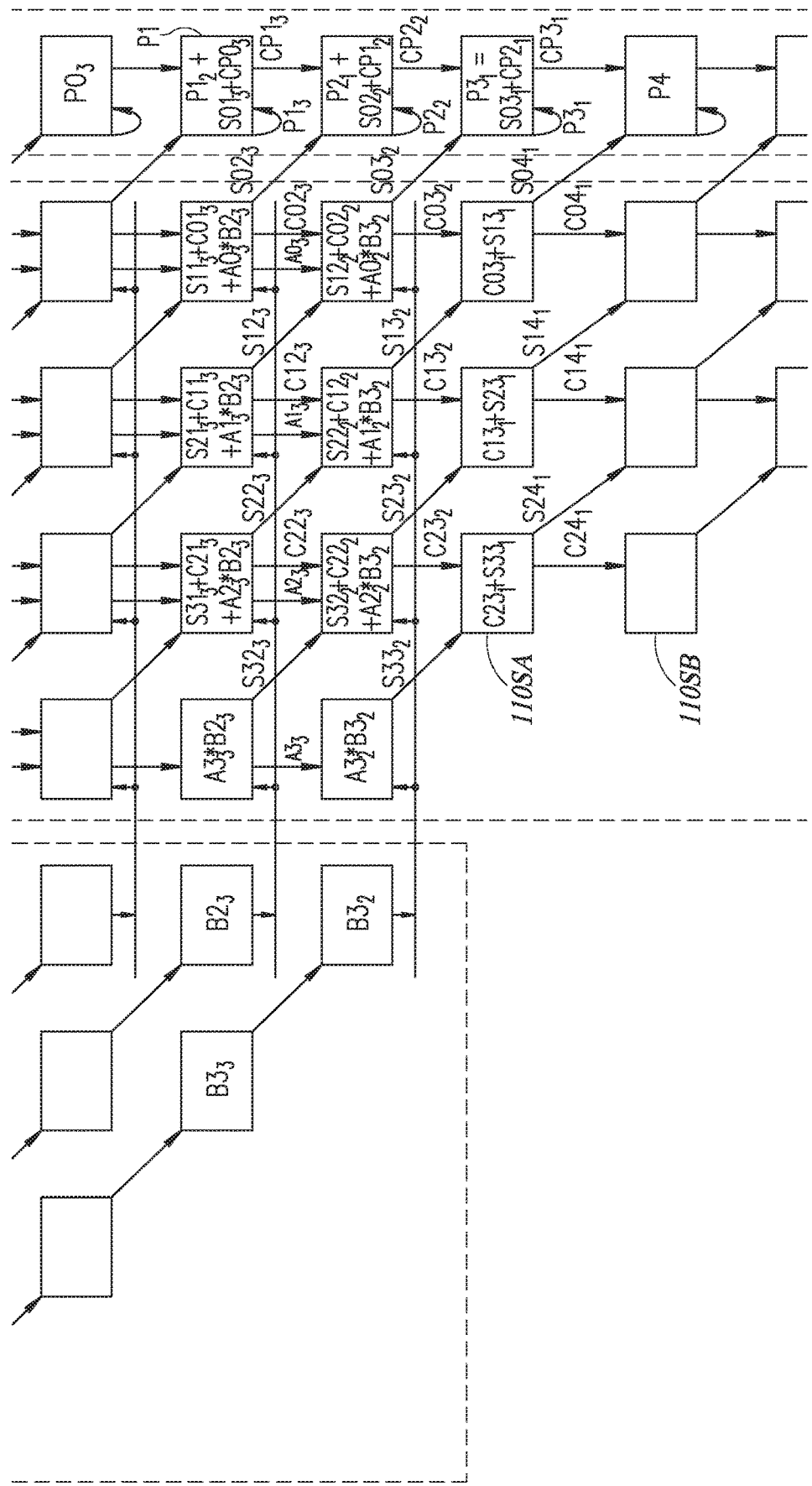

In the fifth cycle, shown in FIG. 3E, the first row (not shown in diagram) and second row (shown at top of FIG. 3E) of multiplier 104 are empty and accumulating bit-line processor P0 no longer accumulates. Data from the first cycle is now in the first row of summing bit-line processors 110S. Since, as mentioned hereinabove, multiplying bit-line processors 110M operating on the MSB (most significant bit) generate only sum bits, there are only three summing bit-line processors 110SA in the first row of the second portion of multiplier 104. The summing bit-line processors 110SA of this row add only the sums and carries received from the previous row and provide their resultant sums and carries to the next row. The LSB bit of this row, S041, is provided to accumulating bit-line processor P4. Accumulating bit-line processors P2 and P3 may operate as discussed hereinabove and accumulating bit-line processor P1 accumulates the LSB data of the third cycle and is done.

Figure 3F:
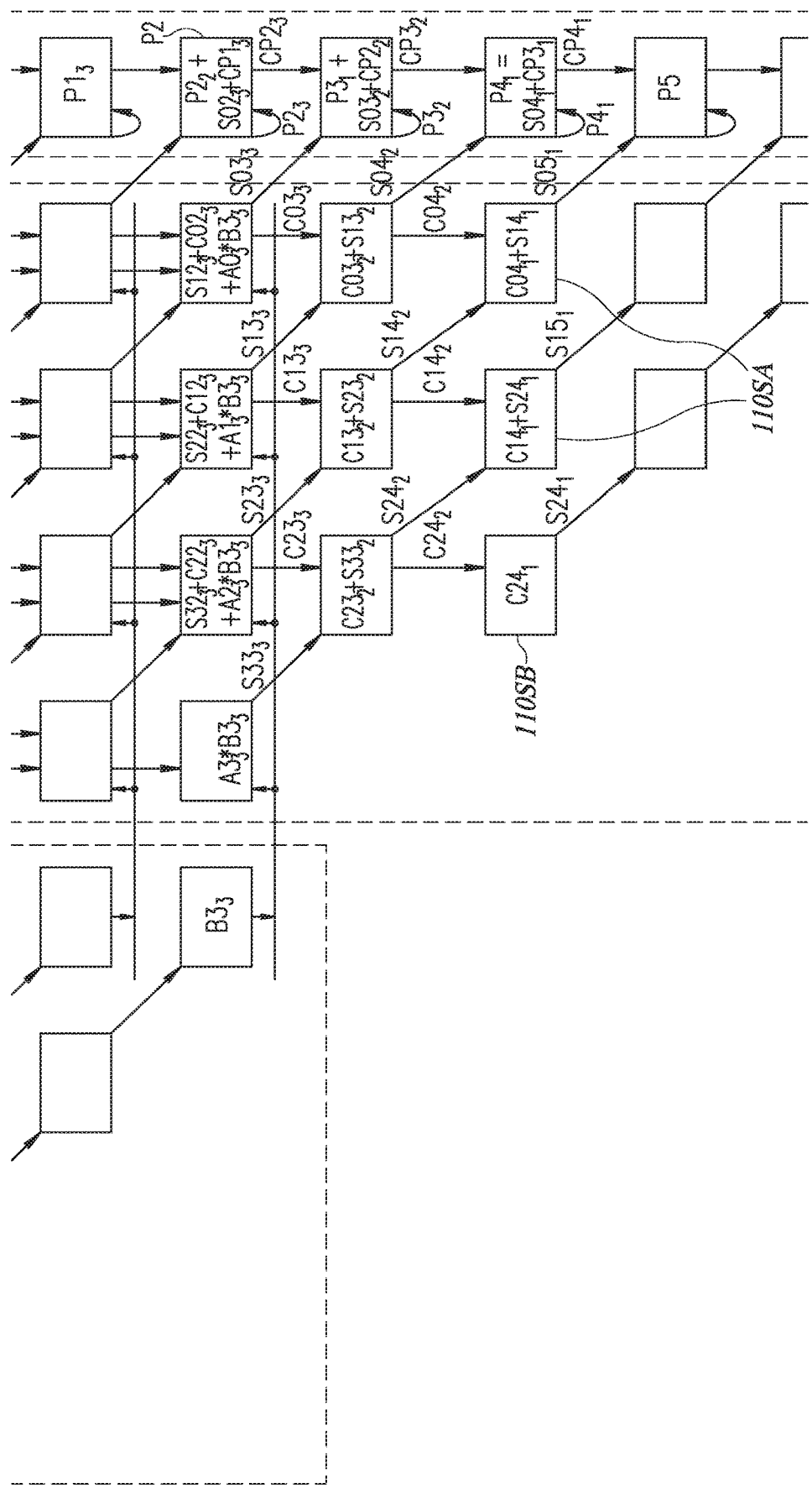

In the sixth cycle, shown in FIG. 3F, the first three rows of multiplier 104 are empty (as a result, the first two rows are not shown in FIG. 3F) and accumulating bit-line processors P0 and P1 no longer accumulate. Data from the first cycle is now in the second row of summing bit-line processors 110S. In this second row, there are three bit-line processors 110S, where the left-most processor is a data-passing processor 110SB and the remaining processors are summing bit-line processors 110SA.

Data-passing processor 110SB may receive carry C24, which may be generated from the sum S33, from the multiplication of A3*B3, and the carry C23 from its neighbor. C24 will be passed onwards until it is passed to P7, the MSB of any of the individual multiplications.

The two summing bit-line processors 110SA of this row add the sums and carries received from the three summing bit-line processors 110SA of the previous row and provide their resultant sums and carries to the next row. The LSB bit of this row, S051, is provided to accumulating bit-line processor P5. Accumulating bit-line processors P3 and P4 may operate as discussed hereinabove and accumulating bit-line processor P2 accumulates the data of the third cycle and is done.

Figure 3G:
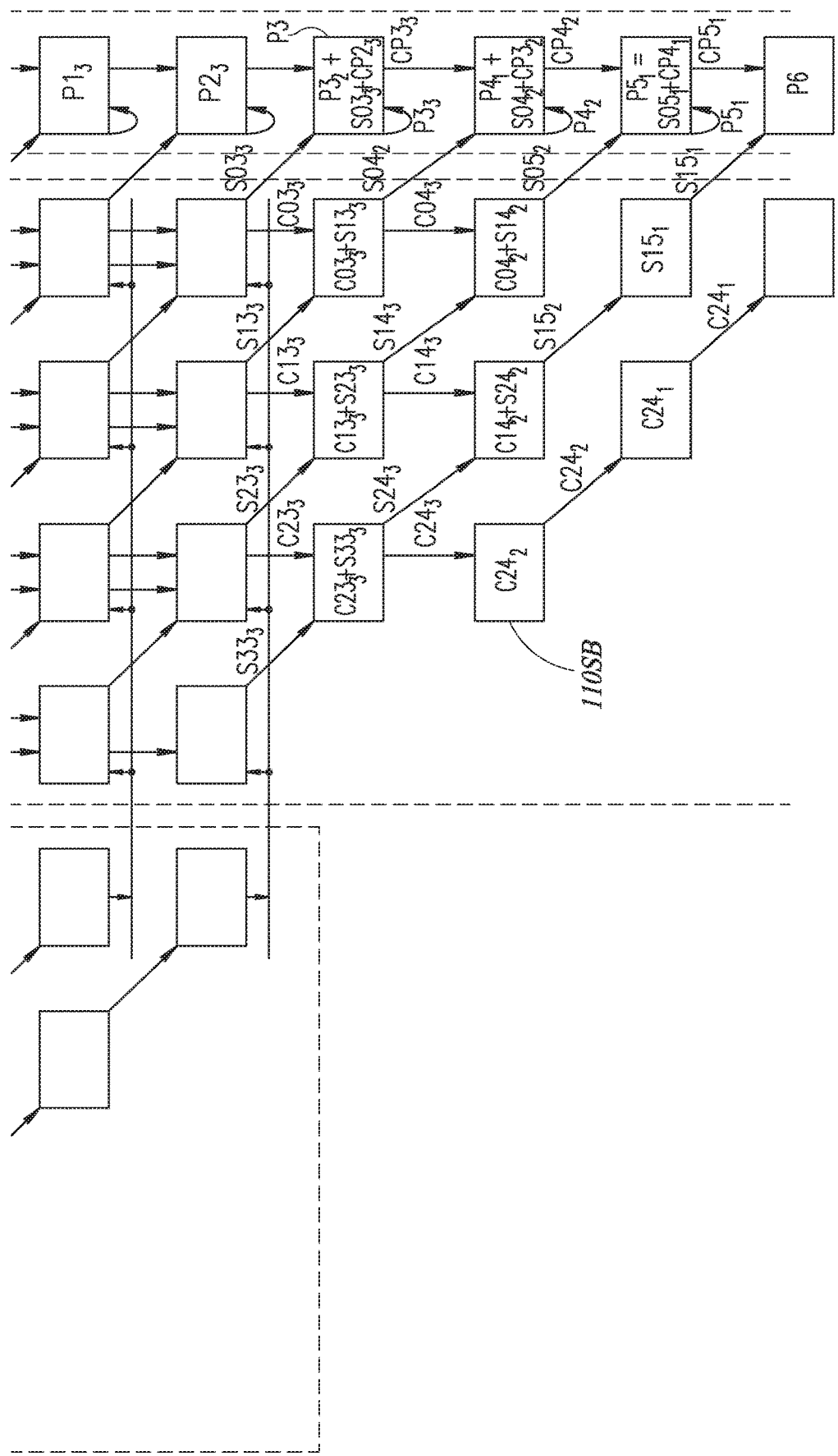

In the seventh cycle, shown in FIG. 3G, the multipliers have finished operating. Data from the first cycle is now in the third row of summing bit-line processors 110S, which has two bit-line processors 110S, both of which are data-passing processors 110SB.

Data-passing processors 110SB may receive carry C24 and sum S15 (generated in the previous row) for the data of cycle 1. Carry C24 may be passed to the next row while sum S15 may be passed to P6.

Accumulating bit-line processors P4 and P5 may operate as discussed hereinabove and accumulating bit-line processor P3 accumulates the data of the third cycle and is done.

Figure 3H:
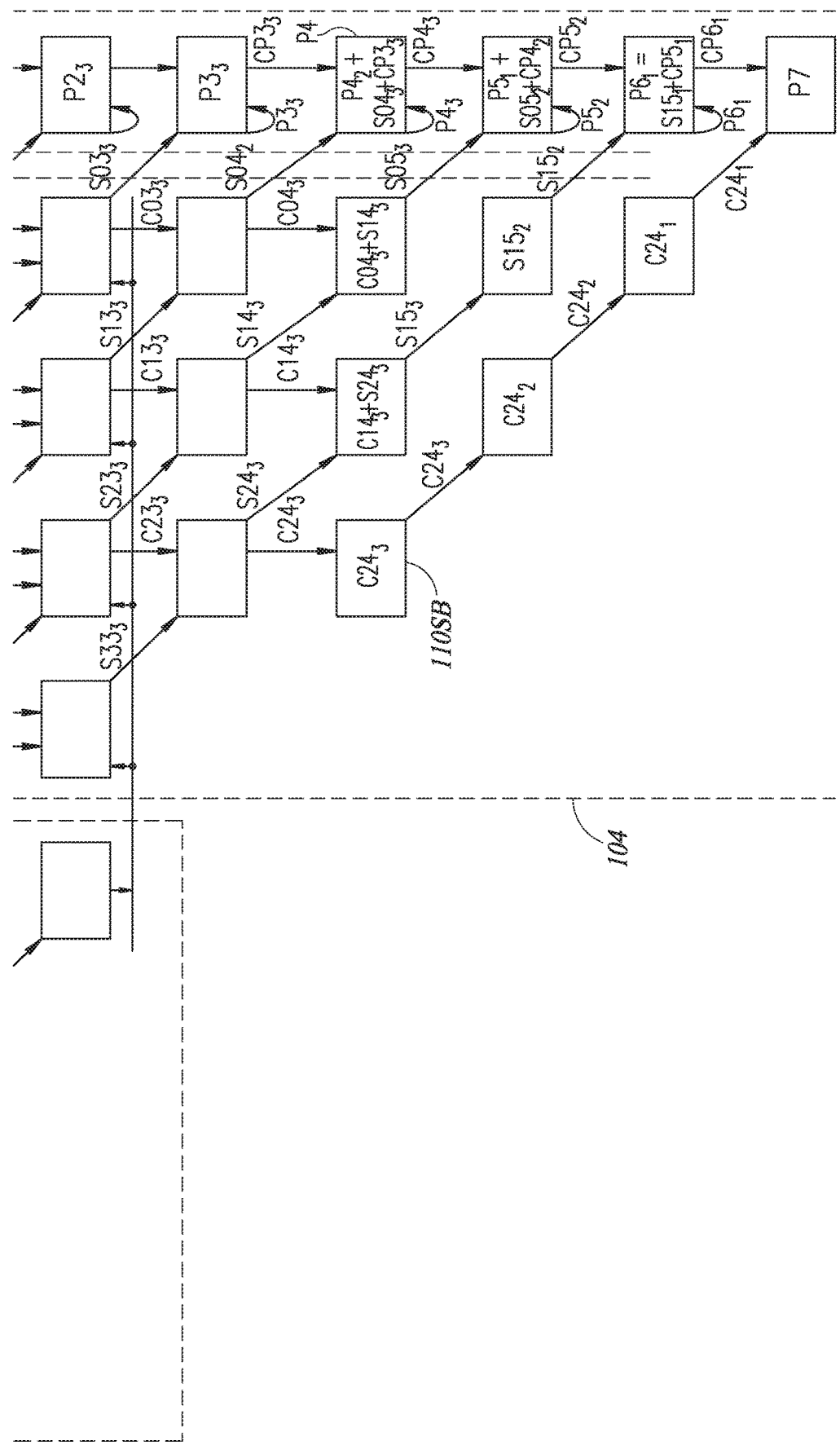

The multiplication process finishes in the eighth cycle, shown in FIG. 3H. The eighth row of multiplier 104 comprises a single, data-passing processor 110SB, which receives the data of carry C24 and passes it on to accumulating bit-line processor P7. Accumulating bit-line processors P5 and P6 may operate as discussed hereinabove and accumulating bit-line processor P4 accumulates the data of the third cycle and is done.

Figure 3I:
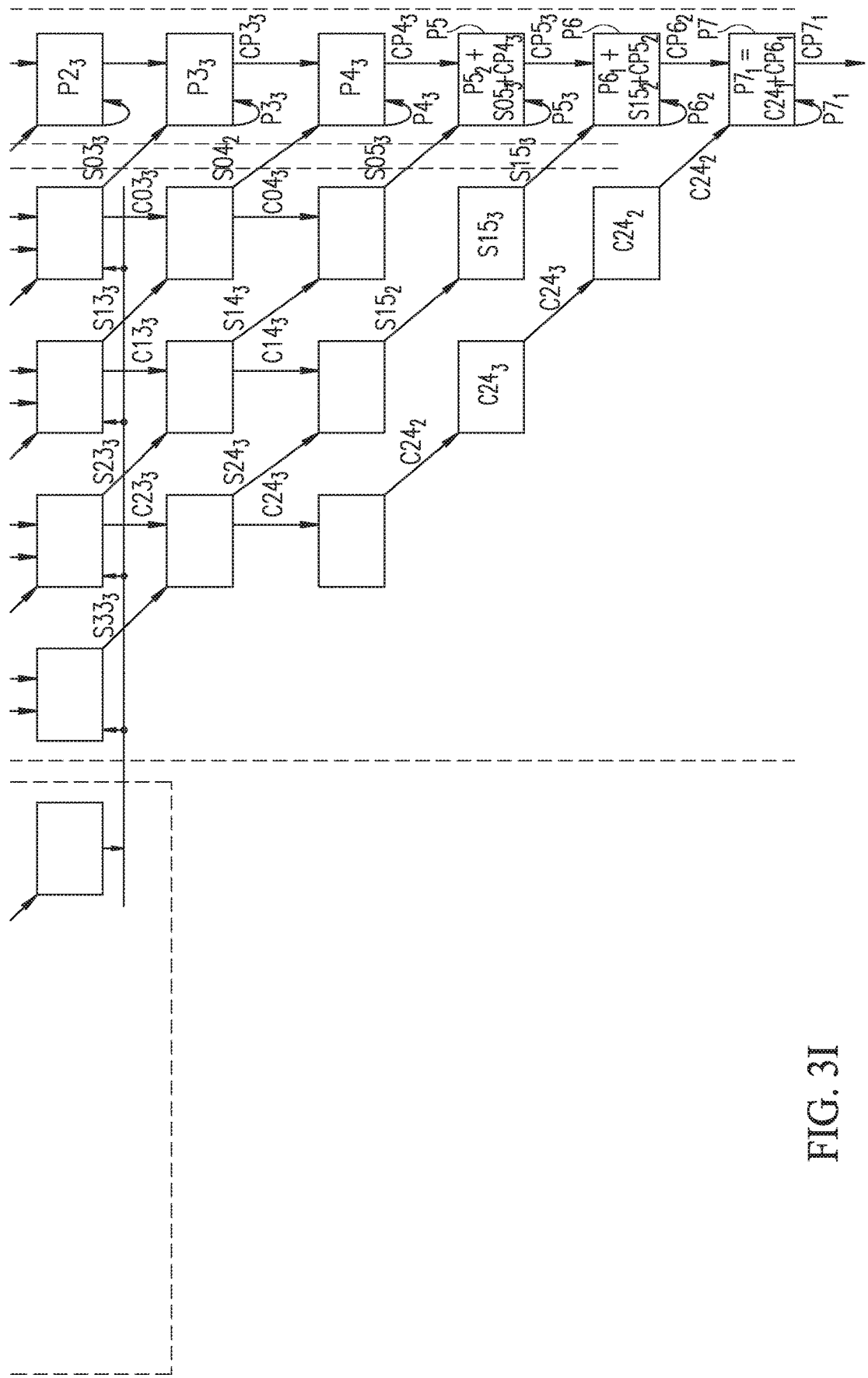

In the next three cycles, the first of which is shown in FIG. 3I, accumulating bit-line processors P5, P6 and P7 accumulate the data of the third, second and third, and first-third cycles, respectively, to finalize their computations.

If there are more than three multiplications to be accumulated, then the output of accumulating bit-line processors 110U (i.e. processors P0-P7) may be passed to tail-end processors 110T (FIG. 1) to continue accumulating bits.

It will be appreciated that bit-wise multiplier-accumulator 100 has a very efficient structure for a MAC unit. When implemented with bit-line processors, it may be particularly efficient, since the various bit-line processors 110 have very similar structures and all of them can be implemented within a memory array, as discussed in more detail hereinbelow. Moreover, bit-wise multiplier-accumulator 100 performs part of the accumulation operations during the multiplication operations, by operating on each bit rather than on the full-bit values of multiplicands A and B.

Further, as mentioned hereinabove, when the multiplication operation has finished, a portion of the accumulation operation has already finished, such that multiplier-accumulator 100 can start on a next multiplication-accumulation operation while finishing up the previous one.

Furthermore, as mentioned hereinabove, bit-wise multiplier-accumulator 100 may also function as a multiplier when only one pair of multiplicands are provided to it.

Figure 4:
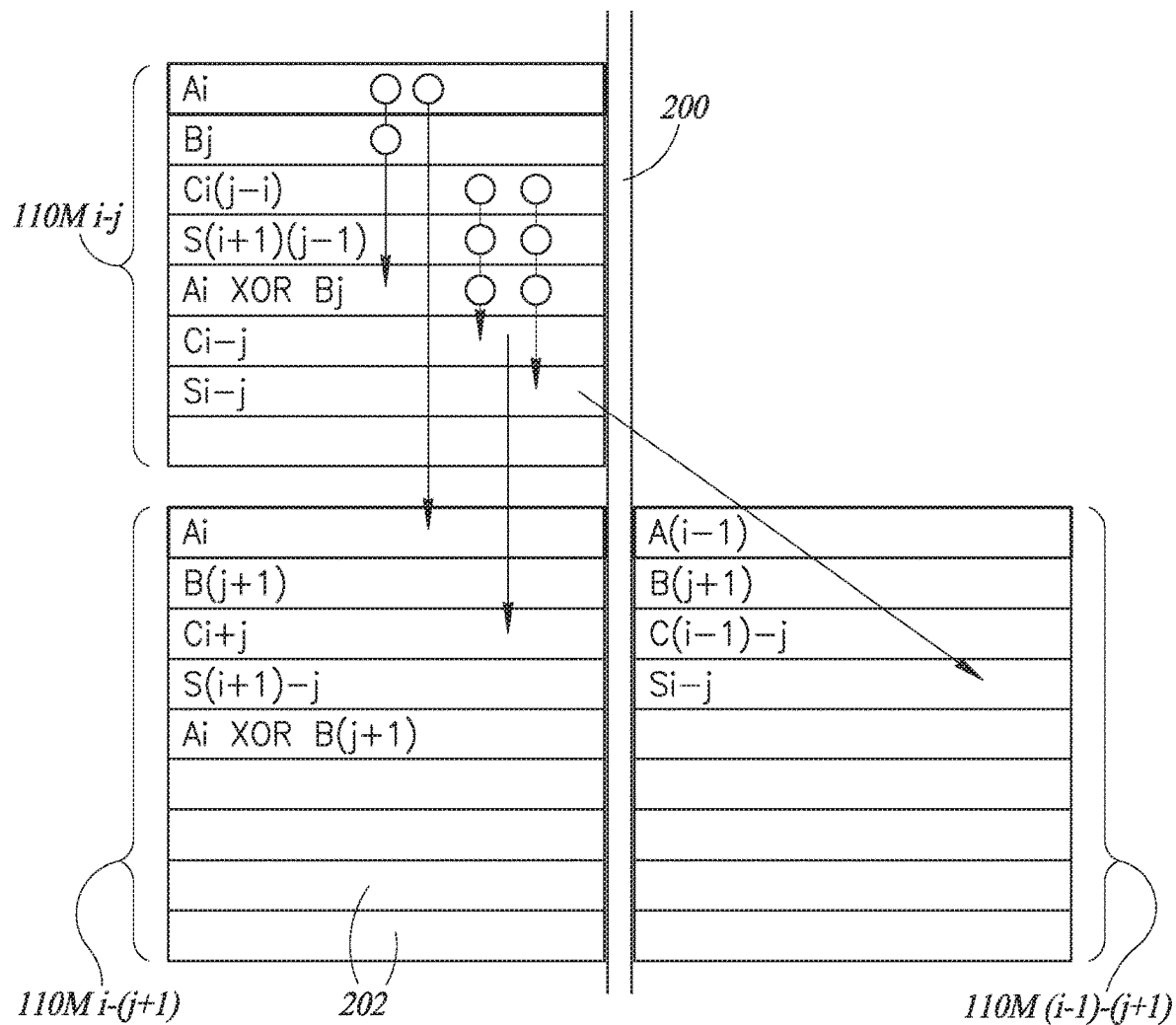
FIG. 4 is a schematic illustration of three neighboring, multiplying bit-line processors 110M.

Reference is now made to FIG. 4, which illustrates three neighboring, multiplying bit-line processors 110M, where multiplying bit-line processor 110M-i-j is in the jth row and the ith column of multiplier-accumulator 100 and operates on the ith bit of multiplicand A and the jth bit of multiplicand B, multiplying bit-line processor 110M-i-(j+1) is also in the ith column but is in the (j+1)th row and multiplying bit-line processor 110M-(i−1)-(j+1) is in the (i−1)th column and (j+1)th row.

Each bit-line processor 110M may be formed of at least 7 memory cells 202 in a single column, all attached to a single bit line 200. Bit-line 200 and memory cells 202 may form part of a memory array in which multiplier-accumulator 100 is implemented. As shown in FIG. 4, each cell holds a different value, where, in the embodiment of FIG. 4, the first cell stores multiplicand bit Ai, the second cell stores multiplicand bit Bj, the third cell stores carry bit Ci(j−1)i from the previous row, and the fourth cell stores sum bit S(i+1)(j−1) from the previous row and the next column. These are the inputs to bit-line processor 110M, most received from the previous cycle but multiplicand bit Bj may be received in the current cycle, before the operations described below occur.

Other cells in bit-line processors 110M may store the intermediate and final results of operations on the four inputs.

The operation of multiplying bit-line processors 110M may occur in four major steps. In the first step, multiplying bit-line processor 110M-i-j may perform an XOR operation on the cells storing Ai and Bj and may store the result in an Ai XOR Bj cell, shown in FIG. 4 as the fifth cell. An XOR operation is discussed in U.S. Pat. No. 8,238,173 and may involve activating the two rows storing Ai and Bj at the same time, thereby to receive a Boolean function result in bit-line 202.

In the second step, multiplying bit-line processor 110M-i-j may implement full adder 122M, as discussed hereinabove, to add together the following bits: Ci-(j−1), S(i+1)(j−1) and (Ai XOR Bj) to produce the carry and sum bits Ci-j and Si-j.

In the third step, multiplying bit-line processor 110M-i-j may read and write bits Ai and C-i-j to multiplying bit-line processor 110M-i-(j+1) and in the fourth step, multiplying bit-line processor 110M-i-j may read and write Si-j to multiplying bit-line processor 110M-(i−1)-(j+1). Alternatively, full adder 122M may write the carry and sum bits Ci-j and Si-j directly.

It will be appreciated that bit-wise multiplier-accumulator 100 may activate every bit-line processor 110 together, such that each cycle is a completely parallel operation. As can be seen in the bottom row of FIG. 4, neighboring bit-line processors 110M store the same type of bit values in the same rows. Thus, in FIG. 4, the rows storing all Ai and Bj may be activated at the same time and the XOR results may be written into the (Ai XOR Bj) cells of all bit-line processors 110 at the same time. This is true for the full adder operations as well.

Parallel copying from one bit-line processor to the next may be implemented via the multiplexers described in U.S. Pat. No. 9,418,719, mentioned hereinabove.

Thus, all operations of a cycle may be performed together, further increasing the pipelined efficiency of bit-wise multiplier-accumulator 100.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for accumulating a plurality N of multiplied M bit values, the method comprising:
    for each pair of multiplicands A and B, each of M bits:
        in M rows, each of M multiplication units, separately multiplying each bit of said multiplicand A with each bit of said multiplicand B and separately summing results from a previous row of said multiplication units;
        in M rows of summing units following said M rows of multiplication units, separately summing results from a previous row of said summing units or said multiplication units, said rows summing output towards an accumulator formed as a column; and
        in accumulator units of said accumulator, separately accumulating each bit of a result from the bit output of each row and passing carry values along the bits of said result from the LSB (least significant bit) to the MSB (most significant bit) of said result,
    wherein said multiplication units, said summing units and said accumulator units are bit-line processors.

2. The method of claim 1 and also comprising providing one new pair of multiplicands A and B to an upper row of said multiplication units at each operating cycle.

3. The method of claim 2 and wherein said separately summing at least comprises generating sum and carry values by at least one of said multiplication and summing units and passing said carry values down a row and said sum values to the right and down a row at each cycle.

4. The method of claim 3 and comprising passing said bits of multiplicand A down a row at each cycle and passing said bits of multiplicand B to the right and down a row at each cycle.

5. The method of claim 1 and wherein M is a power of 2.

6. The method according to claim 1 and also comprising separately storing one bit of said result per cycle after said providing ceases, said storing beginning at said LSB and moving toward said MSB.

7. The method according to claim 1 wherein N is 1 and the output of said accumulator is a multiplication of multiplicands A and B.

8. A method for accumulating a plurality N of multiplied M bit values, the method comprising:
- pipelining multiplicands A and B to a multiply-accumulator such that, at each cycle, a new set of multiplicands is received;
- at each cycle, bit-wise multiplying bits of a current multiplicand A with bits of a current multiplicand B in bit multipliers and providing sum and carry values, output from said bit-wise multiplying, to other bit multipliers ; and
- at each cycle, bit-wise accumulating output of said bit-wise multipliers thereby to accumulate said multiplicands during the pipelining process,
- wherein said bit-wise multiplying and said bit-wise accumulating are implemented in bit-line processors.

9. The method of claim 8 and comprising passing said bits of multiplicand A down a row at each cycle and passing said bits of multiplicand B to the right and down a row at each cycle.

10. The method of claim 8 and wherein M is a power of 2.

11. The method according to claim 8 and also comprising separately storing one bit of said result per cycle after said pipelining ceases, said storing beginning at said LSB and moving toward said MSB.

12. The method according to claim 8 wherein N is 1 and the output of said accumulator is a multiplication of multiplicands A and B.

13. A unit for accumulating a plurality N of multiplied M bit values, the unit comprising:
- a receiving unit to receive a pipeline of multiplicands A and B such that, at each cycle, a new set of multiplicands is received;
- a bit-wise multiplier to bit-wise multiply bits of a current multiplicand A with bits of a current multiplicand B and to handle sum and carry values between bits; and
- a bit-wise accumulator to accumulate output of said bit-wise multiplier thereby to accumulate said multiplicands during the pipelining process,
- wherein said bit-wise multiplier comprises:
  - M rows of M multiplication units each, each multiplication unit to separately multiply each bit of said multiplicand A with each bit of said multiplicand B and to separately sum results from a previous row of said multiplication units; and
  - M rows of summing units following said M rows of multiplication units, each row comprising M summing units, each summing unit to separately sum results from a previous row of said summing units or said multiplication units, said rows summing output towards said bit-wise accumulator.

14. The unit according to claim 13 wherein said bit-wise accumulator comprises:
- accumulator units of said accumulator formed in a column, each accumulator unit to separately accumulate a bit of a result from the bit output of its associated row and to pass carry values along the bits of said result from the LSB (least significant bit) to the MSB (most significant bit) of said result.

15. The unit of claim 14 wherein said multiplication units, said summing units and said accumulator units are bit-line processors.

16. The unit of claim 13 and wherein an upper row of said multiplication units to receive one new pair of multiplicands A and B at each operating cycle.

17. The unit of claim 13 and wherein said summing units are in communication with summing units in a row therebelow to pass carry values down a row and sum values to the right and down a row at each cycle.

18. The unit of claim 13 and wherein said multiplication units are in communication with multiplication units in a row therebelow to pass bits of multiplicand A down a row at each cycle.

19. The unit of claim 13 and also comprising bit passing units to pass each bit of multiplicand B to its associated row of multiplication units.

20. The unit of claim 13 and wherein M is a power of 2.

21. The unit according to claim 13 wherein N is 1 and the output of said bit-wise accumulator is a multiplication of multiplicands A and B.

* * * * *